United States Patent
Wilson et al.

(10) Patent No.: US 10,189,159 B1
(45) Date of Patent: Jan. 29, 2019

(54) METHODS AND SYSTEMS FOR DETECTING STATES OF OPERATION OF A ROBOTIC DEVICE

(71) Applicant: X Development LLC, Mountain View, CA (US)

(72) Inventors: Rob Wilson, Mountain View, CA (US); Jeffrey Thomas Bingham, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 362 days.

(21) Appl. No.: 14/679,286

(22) Filed: Apr. 6, 2015

(51) Int. Cl.
*B25J 9/16* (2006.01)

(52) U.S. Cl.
CPC ............ *B25J 9/1653* (2013.01); *Y10S 901/23* (2013.01); *Y10S 901/46* (2013.01)

(58) Field of Classification Search
CPC .................................................. B25J 9/1653
USPC ............................................................ 702/60
See application file for complete search history.

(56) References Cited

U.S. PATENT DOCUMENTS

| | | | |
|---|---|---|---|
| 6,993,456 B2 | 1/2006 | Brooks et al. | |
| 8,356,207 B2 | 1/2013 | Hosek et al. | |
| 8,798,790 B2 * | 8/2014 | Kamiya | G05B 19/401 318/567 |
| 9,205,560 B1 * | 12/2015 | Edsinger | B25J 9/1674 |
| 2009/0229517 A1 * | 9/2009 | Ko | B05B 5/032 118/696 |
| 2009/0324366 A1 * | 12/2009 | Okazaki | B25J 9/142 414/4 |
| 2011/0173496 A1 * | 7/2011 | Hosek | G05B 23/0235 714/26 |
| 2012/0022683 A1 * | 1/2012 | Fleming | B23K 20/125 700/212 |
| 2012/0048027 A1 * | 3/2012 | Hashiguchi | B25J 9/0087 73/763 |
| 2013/0151010 A1 * | 6/2013 | Kubota | G05B 19/409 700/264 |
| 2015/0019013 A1 * | 1/2015 | Rose | G01L 1/16 700/258 |

(Continued)

OTHER PUBLICATIONS

Christensen et. al., Automatic Synthesis of Fault Detection Modules for Mobile Robots, Journal, 2007, pp. 1-8.

(Continued)

*Primary Examiner* — Moazzam Hossain
*Assistant Examiner* — Omar Mojaddedi
(74) *Attorney, Agent, or Firm* — McDonnell Boehnen Hulbert & Berghoff LLP

(57) ABSTRACT

Examples are provided that describe a model free power detector. In one example, a method includes receiving, by one or more computing devices, a measurement of electrical power to a robotic device. The method also includes receiving, by the one or more computing devices, a measurement of mechanical power by the robotic device. Based on combinations of the electrical power to the robotic device being one of positive, negative, or about zero, and the mechanical power by the robotic device being one of positive, negative, or about zero, the method includes determining possible states of operation of the robotic device. The method also includes providing, by the one or more computing devices, the possible states of operation of the robotic device to a detector.

12 Claims, 5 Drawing Sheets

(56) References Cited

U.S. PATENT DOCUMENTS

| | | | |
|---|---|---|---|
| 2015/0096401 A1* | 4/2015 | Nagai | B25J 9/1674 |
| | | | 74/490.02 |
| 2015/0127147 A1* | 5/2015 | Yamazaki | B25J 13/088 |
| | | | 700/248 |

OTHER PUBLICATIONS

Edwards et. al., Architecture-Driven Self-Adaptation and Self-Management in Robotics Systems, Journal, 2009, pp. 1-10.

* cited by examiner

METHODS AND SYSTEMS FOR DETECTING STATES OF OPERATION OF A ROBOTIC DEVICE

BACKGROUND

Unless otherwise indicated herein, the materials described in this section are not prior art to the claims in this application and are not admitted to be prior art by inclusion in this section.

Robotic devices may be used for applications involving material handling, transportation, welding, assembly, and dispensing, among others. Over time, the manner in which these robotic systems operate is becoming more intelligent, efficient, and more intuitive. Robotic devices are being expected to move and operate to perform new tasks and functions. A demand for efficient robotic devices has helped open up a field of innovation in actuators, movement, sensing techniques, as well as component design and assembly. As the use of robotic devices becomes increasingly prevalent in numerous aspects of modern life, the need for increased collaboration between humans and robotic devices becomes apparent.

SUMMARY

In one example, a method includes receiving, by one or more computing devices, a measurement of electrical power to a robotic device. The method also includes receiving, by the one or more computing devices, a measurement of mechanical power by the robotic device. Based on a combination of the electrical power to the robotic device being one of positive, negative, or about zero, and the mechanical power by the robotic device being one of positive, negative, or about zero, the method includes determining a possible state of operation of the robotic device. The method also includes providing, by the one or more computing devices, the possible state of operation of the robotic device to a detector.

In another example, a system includes a motor of a robotic device, a component of the robotic device, and a transmission of the robotic device. The transmission is coupled to the motor and the component. The system also includes one or more processors, and data storage comprising instructions executable by the one or more processors to cause the system to perform operations. The operations include determining an electrical power value based on measurements of a voltage and a current associated with the motor. The operations also include determining a mechanical power value based on measurements of a force and a velocity associated with the transmission and the component. Based on the electrical power value satisfying a first threshold and the mechanical power value satisfying a second threshold, the operations include determining, by the one or more processors, a state of operation of the robotic device. The operations include providing, by the one or more computing devices, information indicative of the state of operation of the robotic device to a detector.

In another example, a system includes a motor of a robotic device, a component of the robotic device, and a transmission of the robotic device. The transmission is coupled to the motor and the component. The system also includes one or more processors and data storage comprising instructions executable by the one or more processors to cause the system to perform operations. The operations include receiving measurements of a voltage and a current detected at the motor by one or more sensors. The operations also include receiving a measurement of a torque detected at one or more positions along the transmission of the robotic device by the one or more sensors. The operations also include receiving a measurement of a velocity detected at the component of the robotic device by the one or more sensors. The operations include determining an electrical power indicator based on the measurements of the voltage and the current. The operations also include determining a mechanical power indicator based on the measurements of the torque and the velocity. Based on the electrical power indicator and the mechanical power indicator, the operations include determining, by the one or more processors, a state of operation of the robotic device. The operations include providing, by the one or more processors, information indicative of the state of operation of the robotic device to a detector.

In another example, a system is provided that includes a means for receiving, by one or more computing devices, a measurement of electrical power to a robotic device. The system includes a means for receiving, by the one or more computing devices, a measurement of mechanical power by the robotic device. Based on combinations of the electrical power to the robotic device being one of positive, negative, or about zero, and the mechanical power by the robotic device being one of positive, negative, or about zero, the system includes means for determining possible states of operation of the robotic device. The system also includes means for providing, by the one or more computing devices, the possible states of operation of the robotic device to a detector.

These as well as other aspects, advantages, and alternatives, will become apparent to those of ordinary skill in the art by reading the following detailed description, with reference where appropriate to the accompanying figures.

DETAILED DESCRIPTION

Figure 1:
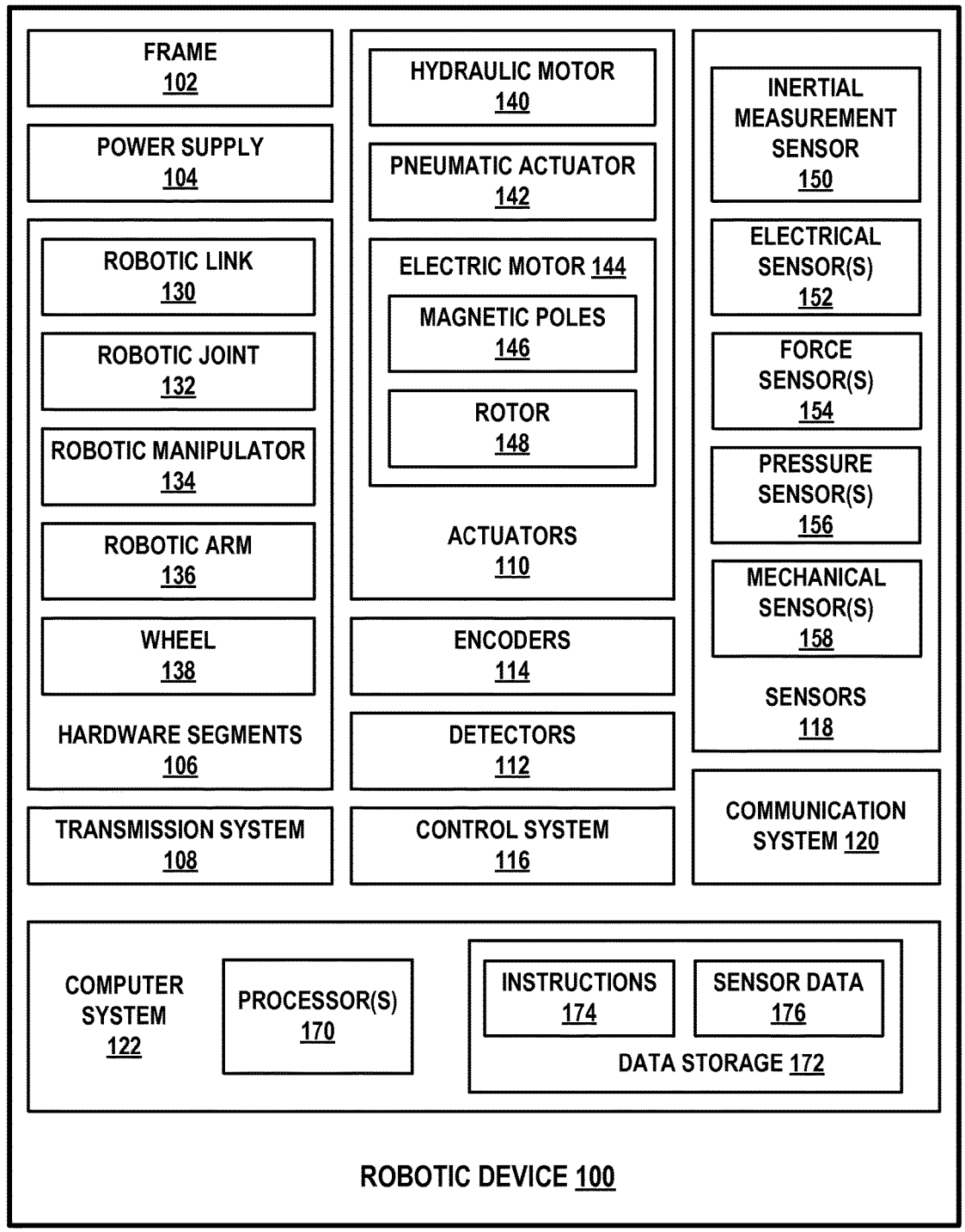
FIG. 1 is a block diagram of a robotic device according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, one or more computing devices may be provided that are configured to receive a measurement of electrical power to a robotic device. In one example, the measurement of electrical power may be based on a voltage and current detected at the input of an electric motor. In another example, the input may be part of a motor drive circuit that is coupled to a motor of the robotic device and configured to provide electrical power to the motor. In this example, the motor may be configured to drive one or more end components such as a link and/or end effector of the robotic device.

In some scenarios, the one or more computing devices may also be configured to receive a measurement of mechanical power by the robotic device. By way of example, the measurement of the mechanical power may be determined by a torque and a velocity associated with a transmission and a given end component of the robotic device. In one embodiment, a torque or force sensor may be used to measure the torque and an encoder may be used to measure the velocity. Other velocity sensors may include a resolver, potentiometer, tachometer, or external measurements via ultrasound, radar, or video feedback. Other sensors may be possible as well.

Further, in these examples, based on combinations of the electrical power to the robotic device being one of positive, negative, or about zero, and the mechanical power by the robotic device being one of positive, negative, or about zero, the one or more computing devices may be configured to determine possible states of operation of the robotic device. For instance, if the electrical power is determined to be positive and the mechanical power is determined to be about zero, then it is possible that the motor is stalled. In another scenario when a motor drive circuit is an open-circuit, if the electrical power is determined to be about zero and the mechanical power is determined to be positive, then it is possible that an external torque is being applied at the electrical input and back-driving the robotic device.

By way of example, once a possible state of operation has been determined, the one or more computing devices may be configured to provide the possible states of operation of the robotic device to a detector. By providing the possible states of operation, the detector may assist in determining whether the robotic device is operating according to a predetermined manner. The detector may be configured to provide information indicative of a fault to one or more computing devices in order reduce a period of time associated with an unintended operation of the robotic device.

Various methods are possible for generating the possible states of operation based on electrical and mechanical parameters, and are contemplated herein within exemplary embodiments. Further, additional parameters may be introduced according to various applications in order to define additional possible states of operation of the robotic device. For example, a motion associated with a given joint of the robotic device may help to determine the additional possible states of operation. By way of example, power measurements taken at multiple locations within a transmission may help to determine the additional possible states of operation.

Referring now to the Figures, FIG. 1 is a simplified block diagram of a robotic device 100, according to an example embodiment. As shown, the robotic device 100 includes a frame 102, a power supply 104, hardware segments 106, a transmission system 108, actuators 110, detectors 112, encoders 114, a control system 116, sensors 118, a communication system 120, and a computer system 122. In other embodiments, the robotic device 100 may include more, fewer, or different components, and each component may include more, fewer, or different sub-components. Additionally, the components and sub-components shown may be combined or divided in any number of ways.

The frame 102 may be configured to support the various components of the robotic device 100. For example, the frame 102 may include aluminum, titanium, other metal/metal-alloy, plastic, composite, wood, or any other solid material having shape and material characteristics to support the components of the robotic device 100.

The power supply 104 may be configured to provide power to some or all of the components of the robotic device 100. To this end, the power supply 104 may include, for example, a rechargeable lithium-ion or lead-acid battery. In some embodiments, one or more banks of batteries may be configured to provide electrical power. Other power supply materials and configurations are possible as well, such as non-rechargeable batteries, etc. For example, the power supply 104 may include a source of energy that powers some or all the components of the robotic device 100. Example sources of energy may include gasoline, diesel, propane, other compressed gas-based fuels, ethanol, solar panels, batteries, or any other sources of energy. Further, for example, the power supply 104 may include wired (e.g., power cable, usb cable, etc.) and/or wireless connectivity (e.g., energy-harvesting antenna, etc.) with an external source (e.g., wall outlet, other power outlet, radiating antenna, etc.) to receive the energy and provide the power to the various components of the robotic device 100. Additionally or alternatively, the power supply 104 may include a combination of fuel tanks, batteries, capacitors, flywheels, etc.

The plurality of moveable hardware segments 106 may include any combination of physical components that are actuated by the robotic device 100 to interact with an environment of the robotic device 100. As shown, the hardware segments 106 include a robotic link 130, a robotic joint 132, a robotic manipulator 134, a robotic arm 136, and a wheel 138. However, in some embodiments, the hardware segments 106 may include a different combination of segments. For instance, the hardware segments 106 may alternatively include three links, four joints, one manipulator, and no wheels. Other combinations are possible as well.

The link 130 may be a rigid component of the robotic device 100 that has a particular shape. As such, the link 130 may include aluminum, titanium, other metal/metal-alloy, plastic, composite, wood, or any other solid material.

The joint 132 is a component of the robotic device 100 that allows a rotational and/or translational degree of freedom to the link 130. For instance, the joint 132 may be a round rotating structure connected to the link 130 to allow the link 130 to rotate about an axis of the joint 132.

The manipulator 134 may be a machine or robotic mechanism that allows the robotic device 100 to interact with various objects in the environment of the robotic device 100. For example, the manipulator 134 may include a series of segments such as the link 130 and the joint 132 that are configured to grasp and/or move objects in the environment of the robotic device 100, usually in several degrees of freedom. Alternatively, for example, the manipulator 134 may include an end-effector tool, such as a robotic wrist or a magnet, that is configured to manipulate the objects in the environment.

The arm 136 may include an interconnected set of links, joints and/or manipulators, such as the link 130, the joint 132, and/or the manipulator 134, to support or move an object through space.

The wheel 138 may include any type of wheel, such as a single wheel, double wheel, compound wheel, castor wheel, or any other wheel configured to rotate to move the robotic device 100 along a heading (e.g., steering direction) of the wheel 38. The wheel 138 may include one or more solid materials suitable for performing the function of the wheel 138 such as plastic, composite, metal, metal compound, etc. By way of example, a castor wheel may be configured to roll along a straight line path, or mounted on a pivot (e.g., swivel, etc.) such that the wheel 138 may align with a direction of travel. Additionally, in some examples, the wheel 138 may include an energy-absorbing material (e.g., rubber, etc.) to facilitate operation and/or maintenance of the wheel 138. For example, the wheel 138 may include a tire coupled to a rim of the wheel 138.

The transmission system 108 may be coupled to at least one of the hardware segments 106. In some examples, the transmission system 108 may include transmission components such as clutches, differentials, pulleys, cables, belts, drive shafts, and/or other elements. Additionally, transmission system 108 may be configured to change speed, torque, and direction of rotation of the hardware segments 106 relative to the actuators 110. Other examples are possible as well.

The plurality of actuators 110 may be configured to actuate the hardware segments 106 and/or to maintain positions of the hardware segments 106. As such, the actuators 110 may include any combination of actuators such as an electric motor, a steam motor, a sterling motor, a combustion motor, a hydraulic motor, a pneumatic motor, or any other actuator. In some examples, a given actuator may include multiple types of motors. For example, a gas-electric hybrid device may include a gasoline engine and an electric engine that are intermittently activated as the given actuator. Other examples are possible as well. As shown, the actuators 110 include a hydraulic motor 140, a pneumatic actuator 142, and an electric motor 144. However, in some embodiments, the actuators 110 may include a different number or combination of motors. For instance, the actuators 110 may alternatively include five electric motors only. Other combinations are possible as well.

The hydraulic motor 140 may include any mechanical actuator that converts hydraulic pressure and flow into torque and angular displacement (e.g., rotation). Example hydraulic motors include gear and vane motors, gerotor motors, axial plunger motors, radial piston motors, etc.

The pneumatic actuator 142 may include any actuator that converts energy in the form of a compressed fluid into mechanical motion. The mechanical motion may be rotary and/or linear, depending on the type of the pneumatic actuator 142. Example pneumatic actuators include tie rod cylinders, rotary pneumatic actuators, grippers, rodless pneumatic actuators, pneumatic artificial muscles, specialty actuators that combine rotary and linear motion, vacuum generators, etc.

The electric motor 144 may include any actuator that converts electrical energy into mechanical motion. For instance, the electric motor 144 may receive an electric current (e.g., AC current, DC current, etc.) from the power supply 104 and responsively provide the mechanical motion. To facilitate the energy conversion, an electric motor may operate according to various physical principles such as magnetic, electrostatic, piezoelectric, etc. As shown, the electrical motor 144 is of the magnetic variety. As such, the electric motor 144 includes a plurality of magnetic poles 146 arranged around a rotor 148. The magnetic poles 146, for example, may be formed as coils that are electronically switched by the robotic device 100. In turn, the rotor 148 may include a magnet or other material that is attracted/repelled towards one or more of the magnetic poles 146. The resulting motion of the rotor 148 may correspond to the mechanical motion that is caused by the electrical energy received by the magnetic poles 146. Other arrangements for the electric motor 144 are possible as well such as coreless motors, axial rotor motors, servo motors, stepper motors, linear motors, etc.

The detector(s) 112 may be configured to receive possible states of operation of the robotic device 100 and provide information indicative of the possible states of operation to one or more processors 170. In one example, the one or more processors 170 may be configured to receive information about an expected state of operation of the robotic device 100 and based on the received information, the one or more processors 170 may determine that the possible states of operation differ from the expected state of operation of the robotic device 100. In this example, based on a possible state of operation, the robotic device 100 may be instructed to begin powering down.

The encoders 114 may be coupled to the actuators 110 and configured to provide data indicative of motion and/or orientation of the actuators 110. For example, the encoders 114 may include a rotary encoder, a shaft encoder, or any other electro-mechanical device configured to convert an angular position/motion of a shaft of a given actuator to an analog or digital signal (e.g., the data, etc.). Various implementations are possible for the encoders 114 such as mechanical (e.g., metal disc containing a set of concentric rings of openings), optical (e.g., glass/plastic with transparent and opaque areas), magnetic (e.g., disc that includes a series of magnetic poles), capacitive (e.g., asymmetrical shaped disc rotated within the encoder to adjust capacitance between two electrodes), or any other implementation.

In some examples, the data provided by the encoders 114 may indicate a change in a position (e.g., orientation) of a given actuator of the actuators 110. Further, for example, the encoders 114 may provide a signal (e.g., index pulse, etc.) indicative of the given actuator being at a particular orientation. Further, in some examples, the data provided by the encoders 114 may be processed by the robotic device 100 to determine speeds of the actuators 110. For example, a time measurement may be obtained by the robotic device 100 in addition to the data from the encoders 114 to determine the speeds of the actuators 110.

Accordingly, in some examples, the encoders 114 may include an incremental encoder configured to provide the data indicative of motion of the actuators 110. In these examples, the robotic device 100 may cause actuators 110 to actuate one or more of the hardware segments 106, until the signal (e.g., index pulse, etc.) of the encoders 114 is detected to determine the particular orientations of the actuators 110.

Additionally or alternatively, in some examples, the encoders 114 may include an absolute encoder configured to provide the data. The absolute encoder, for example, may be configured to detect motion of the actuators 110 even if the absolute encoder is not provided with power. In these examples, the encoders 114 may provide the data indicative of the orientations of the actuators 110 without the robotic device 100 actuating the hardware segments 106 until the signal (e.g., index pulse) is received from the encoders 114.

The control system 116 may be configured to control operation of the robotic device 100 and/or components thereof. For instance, the control system 116 may include any combination of mechanisms configured to control the hardware segments 106. For example, the robotic device 100 may be an assembly line robot, and the control system 116 may control the robotic arm 136 to move an object from one location to another.

In some examples, the control system 116 may be implemented as a control loop that receives inputs from the detectors 112 and encoders 114 and provides output signals to control power provided to the actuators 110 to achieve a particular speed of motion of the hardware segments 106. Example control loops may include open loops, closed loops, etc. For example, the control system 116 may be implemented as proportional-integral-derivative (PID) controller. Other examples are possible as well. Thus, for example, the control system 116 may be configured to measure and/or control electric signals in the actuators 110. The control system 116 may additionally or alternatively include components other than those shown in FIG. 1.

The sensor(s) 118 may include a number of sensors configured to sense information about an environment in which the robotic device 100 is located, as well as sensing components in the robotic device 100. Further, in some examples, the sensors 118 may include one or more actuators (not shown) to actuate some or all of the sensors 118. As shown, the sensors of the sensor system 204 include an inertial measurement sensor (IMS) 150, one or more electrical sensors 152, one or more force sensors 154, one or more pressure sensors 156, and one or more mechanical sensors 158. The sensors 118 may include additional sensors as well, including, for example, sensors that monitor internal systems of the robotic device 100 (e.g., an $O_2$ monitor, a fuel gauge, a temperature monitor, etc.). Other sensors are possible as well.

The IMS 150 may be any combination of sensors configured to sense position and orientation changes of the robotic device 100 or components thereof based on inertial acceleration. In some embodiments, the combination of sensors may include, for example, accelerometers and gyroscopes. Other combinations of sensors are possible as well.

The electrical sensor(s) 152 may be any sensor configured to determine electrical properties associated with various components of the robotic device 100 (e.g., electric motor 144). For example, the electrical sensor 152 may include a current sensor (e.g., using electric current), a voltage detector (e.g., using voltage), or any other electrical sensor capable of measuring a voltage and/or current. By way of example, the electrical power may be determined according to a measured voltage and a measured current provided to an electric motor 144 of the robotic device 100. In this example, the electric motor 144 is coupled to the transmission system 108 and the transmission system 108 is coupled to a component of the robotic device 100.

The force sensor(s) 154 may include any combination of sensors configured to measure force at various parts of the robotic device 100. For example, the force sensors 154 may include a force gauge, spring scale, strain gauge, load cell, load pin, or any other force sensor. The force sensors 154 may be arranged in various parts of the robotic device 100 to measure forces along the robotic device 100, and provide an indication of the forces to the robotic device 100. For example, a strain gauge may be placed between the robotic link 130 and the robotic joint 132 to measure the force between the two components. Further, in some examples, the force sensors 154 may be configured to measure a weight of one or more of the components in the robotic device 100. In one scenario, the robotic device 100 may adjust a position of a given segment to an upright position, and an associated force sensor may thus measure the weight of the given segment.

The pressure sensor(s) 156 may include any combination of sensors configured to measure pressure at various parts of the robotic device 100. For example, the pressure sensors 156 may include absolute pressure sensors, gauge pressure sensors, vacuum pressure sensors, differential pressure sensors, sealed pressure sensors, etc. The pressure sensors 156 may be arranged in various parts of the robotic device 100 to measure various pressures. For example, the pressure sensors 156 may measure pressure of fluid in the hydraulic motor 140, or pressure at an interface between two of the hardware segments 106, among other possibilities.

The mechanical sensor(s) 158 may include any combination of sensors configured to measure mechanical properties associated with the robotic device 100. By way of example, the mechanical sensors 158 may include one or more torque sensors for measuring a torque of the transmission system 108. In one scenario, the mechanical power is determined according to a torque sensor coupled to the transmission system 108 and an encoder 114 associated with a hardware segment of the hardware segments 106 of the robotic device 100.

The communication system 120 may include a wired communication interface (e.g., parallel port, USB, etc.) and/or a wireless communication interface (e.g., antennae, transceivers, etc.) to receive and/or provide signals from/to external devices. In some examples, the communication system 120 may receive instructions for operation of the robotic device 100. Additionally or alternatively, in some examples, the communication system 120 may provide output data such as data from the encoders 114 and/or data from the sensors 118.

The computer system 122 includes one or more processors 170 and data storage 172. In some examples, some components of the computer system 122 may be distributed across multiple computing devices. For example, the data storage 172 may be included in an external data storage device communicatively linked with the robotic device 100. Other examples are possible as well. However, for the sake of example, the components are shown and described as part of the computer system 122.

The computer system 122 may be configured to transmit data to and receive data from one or more of the various components of the robotic device 100. To this end, the computer system 122 may be communicatively linked to one or more of the power supply 104, the actuators 110, the encoders 114, the control system 116, the sensors 118, and/or the communication system 120 by a system bus, network, and/or other connection mechanism (not shown in FIG. 1).

The computer system 122 may be further configured to interact with and control one or more hardware segments 106 of the robotic device 100. For example, the computer system 122 may be configured to provide instructions to the control system 116 to cause the actuators 110 to adjust positions of the hardware segments 106. As another example, the computer system 122 may be configured to provide instructions to the control system 116 to cause the electric motor 144 to no longer receive electrical power based on a given state of operation of the robotic device 100. Other examples are possible as well.

The processor(s) 170 may comprise one or more general-purpose processors and/or one or more special-purpose processors. To the extent the processor 170 includes more than one processor, such processors may work separately or in combination. For example, a first processor of the processor(s) 170 may operate the actuators 110, and a second processor of the processor(s) 170 may operate the sensors 118, etc. The data storage 172, in turn, may comprise one or more volatile and/or one or more non-volatile storage components, such as optical, magnetic, and/or organic storage, and the data storage 172 may be integrated in whole or in part with the processor 170.

In some embodiments, the data storage 172 may contain instructions 174 (e.g., program logic) executable by the processor 170 to perform various functions of the robotic device 100. The data storage 172 may contain additional instructions as well, including instructions to transmit data to, receive data from, interact with, and/or control one or more of the actuators 110, the encoders 114, the control system 116, the sensors 118, the detectors 112, and/or any other component of the robotic device 100. Although not illustrated in FIG. 1, the data storage 172 may store other data such as data collected by the encoders 114, the control system 116, and/or data from the sensors 118, etc. In one example, the data storage 172 may store sensor data 176. The sensor data 176 may be used to determine states of operation of the robotic device 100. The computer system 122 may additionally or alternatively include components other than those shown in FIG. 1.

In one scenario, the data storage 172 may comprise instructions executable by the one or more processors 170 to cause the system to perform operations such as determining an electrical power value based on measurements of a voltage and a current associated with the electric motor 144. The operations may also include determining a mechanical power value based on measurements of a force and a velocity associated with the transmission system 108 and a hardware segment of the hardware segments 106 of the robotic device 100. Based on the electrical power value satisfying a first threshold and the mechanical power value satisfying a second threshold, the one or more processors 170 may be configured to determine a state of operation of the robotic device 100. Further the one or more processors 170 may provide information indicative of the state of operation of the robotic device 100 to a detector 114.

In another scenario, the first threshold and the second threshold are updated according to an expected state of operation of the robotic device 100. Updating the first threshold and the second threshold may allow the robotic device 100 to determine a given state of operation across a plurality of operations in different settings. In another example, the one or more processors 170 may be configured to receive information indicative of an expected state of operation of the robotic device 100. In this example, the first threshold may be updated based on the mechanical power value satisfying the second threshold and the information indicative of the expected stated of operation. Further, based on the electrical power value satisfying an updated first threshold, the one or more processors 170 may determine the state of operation of the robotic device 100.

By way of example, the one or more processors 170 may be configured to receive information indicative of an expected state of operation. In this example, the second threshold may be updated based on the electrical power value satisfying the first threshold and the information indicative of the expected stated of operation. Based on the mechanical power value satisfying an updated second threshold, the one or more processors 170 may be configured to determine the state of operation of the robotic device 100.

Referring to FIG. 1, in some embodiments, one or more of the actuators 110, the encoders 114, the control system 116, the sensors 118, and the communication system 120 may be configured to work in an interconnected fashion with other components within and/or outside their respective systems. Further, the robotic device 100 may include one or more elements in addition to or instead of those shown. For example, the robotic device 100 may include one or more additional interfaces and/or power supplies. Other additional components are possible as well. In such embodiments, the data storage 172 may further include instructions (e.g., instructions 174, etc.) executable by the processor 170 to control and/or communicate with the additional components.

Still further, while each of the components and systems are shown to be integrated in the robotic device 100, in some embodiments, one or more components or systems may be removably mounted to or otherwise connected (e.g., mechanically or electrically) to the robotic device 100 using wired or wireless connections. The robotic device 100 may take other forms as well. Further, in some embodiments, the robotic device 100 may include more, fewer, or different components than those shown in FIG. 1.

In some examples, the robotic device 100 may be configured to determine additional states of operation based on physical parameters of the various components of the robotic device 100. In one example, physical parameters (e.g., electrical properties, mechanical properties, etc.) of the actuators 110 may be unique to the robotic device 100. In this example, the robotic device 100 may be configured to cause one or more of the actuators 110 to actuate the hardware segments 106, and responsively measure the physical parameters of the actuators 110 (e.g., resistance, current, etc.). As a variation of this example, the robotic device 100 may measure other physical parameters of the actuators 110, such as positions of the magnetic poles 146. For example, the robotic device 100 may measure biases of the encoders 114 that correspond to the positions of the magnetic poles 146. In turn, the robotic device 100 may utilize the measured parameters to determine the additional states of operation.

In another example, the robotic device 100 may be configured to cause the actuators 110 to actuate the hardware segments 106 to correspond to a particular arrangement. In this example, the robotic device 100 may then measure various parameters, such as the outputs of the force sensors 154, the pressure sensors 156, the control system 116, or any other parameter, in response to adjusting the hardware segments 106 to the particular arrangement. In turn, the robotic device 100 may utilize these parameters to determine the additional states of operation of the robotic device 100. Other examples are possible as well and are described in greater detail within embodiments of the present disclosure.

Figure 2:
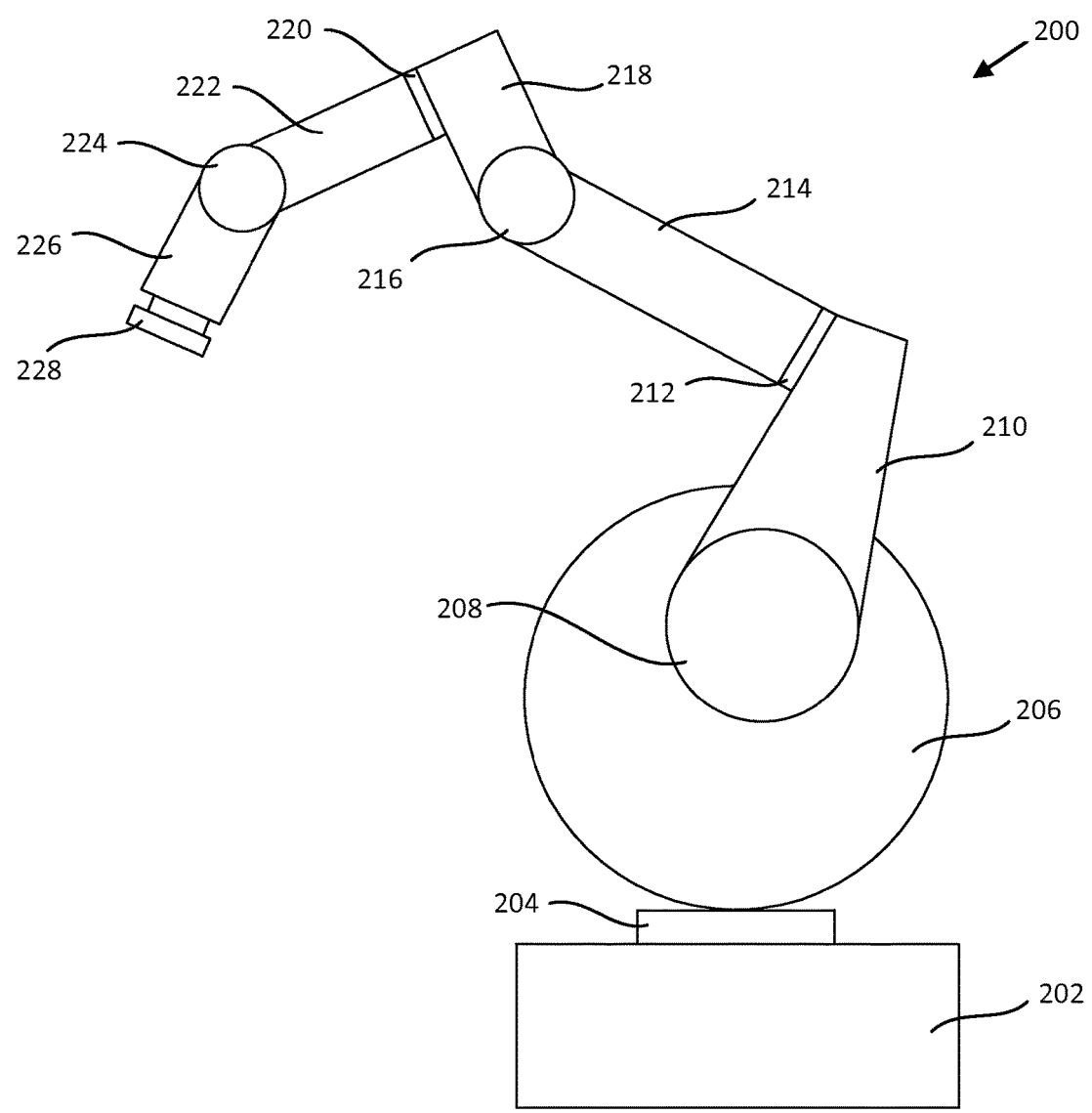
FIG. 2 illustrates another example robotic device.

FIG. 2 illustrates an example robotic device 200. The robotic device 200 may contain hardware, such as a processor, one or more computing devices, memory or storage, and sensors that enable the robotic device 200 to operate the robotic device 200 for use in assembly operations, pick and place work, spot welding, etc. The robotic device 200 may be powered by various means such as electric motors, pneumatic motors, hydraulic motors, etc. The robotic device 200 includes a base 202, links 206, 210, 214, 218, 222, and 226, joints 204, 208, 212, 216, 220, and 224, and manipulator 228.

The base 202 may provide a platform in order to provide support for the robotic device 200. The base 202 may be stationary or be coupled to wheels in order to provide movement of the robotic device 200. The base may comprise any number of materials such as aluminum, steel, stainless steel, etc., that may be suitable for a given environment associated with the robotic device 200.

The links 206, 210, 214, 218, 222, and 226 may be configured to be moved according to a programmable set of instructions. For instance, the links may be configured to follow a predetermined set of movements in order to accomplish a repetitive task over a period of time. By way of example, the links 206, 210, 214, 218, 222, and 226 may form a kinematic chain that defines relative movement of a given link of links 206, 210, 214, 218, 222, and 226 at a given joint of the joints 204, 208, 212, 216, 220, and 224.

The joints 204, 208, 212, 216, 220, and 224 may be configured to rotate through the use of a mechanical gear system. In one example, the mechanical gear system may be driven by a strain wave gearing, a cycloid drive, etc. The mechanical gear system selected would depend on a number of factors related to the operation of the robotic device 200 such as the length of the given link of the links 206, 210, 214, 218, 222, and 226, speed of rotation, desired gear reduction, etc. Providing power to the joints 204, 208, 212, 216, 220, and 224 will allow for the links 206, 210, 214, 218, 222, and 226 to be moved in a way that allows the manipulator 228 to interact with an environment.

In one example, joint 224 may be configured to rotate link 226 in an upward direction. In this example, an object may be located above the motion path associated with rotating link 226 and thereby causing a constraint to the link 226. Depending on a period of time associated with the motion, a detector may receive information indicative that electrical power to a motor associated with joint 224 is positive and mechanical power associated with the link 226 is about zero in order to determine that the link 226 is pressing a constraint. One or more computing devices (not shown) may then be configured to provide a different action based on the operational state in order to accomplish a given task associated with the robotic device 200.

In another example, the robotic device 200 may be configured to perform a predetermined motion according to a motion plan that results in link 222 rotating and link 206 remaining stationary. In the event that an unexpected external torque is applied to link 206 and thereby causing link 206 to move, then torque and velocity sensors will detect a power associated with the mechanical link and current and voltage sensors will detect a power associated with the electrical power generated from the motor. Based on signs of these detected powers, a given detector may provide information indicative of the possible state of operation associated with link 206 to one or more computing devices. In this example, based on a determination of an unexpected operation of the robotic device 200, the one or more computing devices may be configured to disable the electrical input associated with the robotic device 200.

The manipulator 228 may be configured to allow the robotic device 200 to interact the environment as shown in FIG. 2. In one example, the manipulator 228 may perform appropriate placement of an element through various operations such as lifting, maneuvering, and gripping etc. By way of example, the manipulator may be exchanged for another end effector that would provide the robotic device 200 with different functionality.

The robotic device 200 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications.

Figure 3:
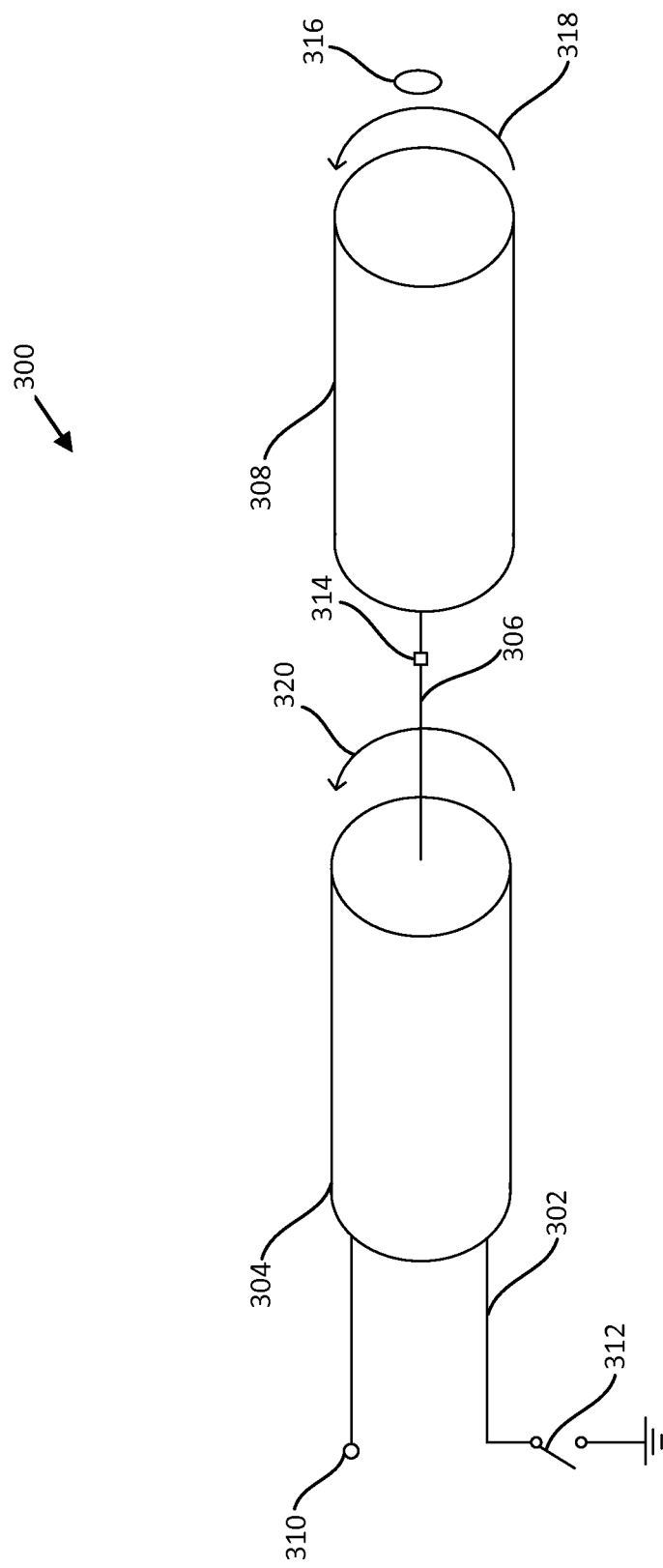
FIG. 3 illustrates an example robotic system.

FIG. 3 illustrates another example robotic system 300. The robotic system 300 comprises a motor drive circuit 302 for driving a motor 304. As shown in FIG. 3, the motor 304 is coupled to a transmission 306. The transmission 306 is coupled to a robotic component 308.

The motor drive circuit 302 may comprise a voltage input 310 for providing power to the motor 304. Depending on a position of switch 312, the motor drive circuit 302 may be either an open-circuit or a closed-circuit. In one example, a measurement of electrical power may be determined by direct measurements of a voltage and a winding current associated with the motor drive circuit 302.

The measurements of the voltage and the winding current associated with the motor drive circuit 302 may be used to determine an electrical power at the motor 304. The electrical power may be determined according to:

$$P_{Elec} = V_{in} I. \quad [1]$$

In equation [1], the electrical power, $P_{Elec}$, is determined according to the product of $V_{in}$, a voltage provided at the voltage input 310, and I, the winding current associated with the motor drive circuit 302. A sign associated with the electrical power, $P_{Elec}$, may be determined according to the voltage provided at the voltage input 310 and a flow of the winding current within the motor drive circuit 302.

Referring to FIG. 3, the motor 304 may be configured to receive electrical power and thereby cause the motor 304 to move in a given direction. The motor 304 may include a motor shaft, a stationary stator, and a rotor coupled to the motor shaft such that the motor shaft is configured to deliver mechanical power to the transmission 306, thereby by causing a rotation of the transmission 306 (which is coupled to the robotic component 308).

In particular, the stator may be a stationary part of motor 304. For example, the stator may include an electromagnet and a coil including windings that can be composed of any conductive material. On the other hand, the rotor may be a non-stationary portion of the motor 304 and may include conductors that interact with a magnetic field produced by the windings in the stator. Such an interaction may result in the development of a torque that can cause a rotation of the rotor about an axis, thereby allowing the motor shaft to deliver mechanical power to the transmission 306. Other components may also be included and additional motor configurations may also be possible.

As shown in FIG. 3, a torque sensor 314 may be coupled to the transmission 306 for detecting a transmission torque 320. In this example, the torque sensor 314 may be configured to determine the transmission torque 320 and a direction associated with rotation of the transmission 306. Further, the torque sensor 314 may be configured to provide data representative of the transmission torque 320 to one or more computing devices from FIG. 1.

The robotic component 308 is coupled to the transmission 306 and is configured to rotate. In one example, the robotic component 308 may be coupled to a given link of the robotic device 200 of FIG. 2 for performing a given movement. An encoder 316 may be coupled to the robotic device 200 and configured to measure a velocity 318 associated with the robotic component 308. The encoder 316 may also be configured to provide data representative of the velocity 318 to one or more computing devices from FIG. 1.

Based on the data representative of the transmission torque 320 and the data representative of the velocity 318, a mechanical power associated with the robotic component may be determined. In one example, one or more computing devices may determine the mechanical power based on:

$$P_{Mech} = T_{Trans} \dot{x}. \quad [2]$$

In equation [2], the mechanical power, $P_{Mech}$, is determined according to the product of $\tau_{Trans}$, the transmission torque 320, and $\dot{x}$, the velocity 318. According to a direction associated with $\dot{x}$ and a direction associated with $\tau_{Trans}$, a sign associated with the mechanical power, $P_{Mech}$, may be determined. For example, if the robotic component 308 is moving in a clock-wise direction, then the mechanical power may be associated with a positive value. In another example, if the robotic component 308 is moving in a counter clock-wise direction, then the mechanical power may be associated with a negative value.

According to the sign associated with an electrical power to the robotic device and a sign associated with mechanical power of the robotic device, an operational state associated with a given link of the robotic device may be determined. Table 1 illustrates example operational states based on the sign associated with the electrical power and the mechanical power.

TABLE 1

| Electrical Power | Mechanical Power | Operational state |
|---|---|---|
| + | + | System is accelerating |
| + | 0 | System is stopped/stalled |
| + | − | System is decelerating |
| 0 | + | System is back-driven from transmission input and open-circuit |
| 0 | 0 | System is off |
| 0 | − | System is back-driven from transmission output and open-circuit |
| − | + | System is back-driven from transmission input and closed-circuit |
| − | 0 | Indefinite |
| − | − | System is back-driven from transmission output and closed-circuit |

Referring to Table 1, based on the electrical power being positive and the mechanical power being positive or negative, then it may be determined that the system is either accelerating or decelerating. In one scenario, if the electrical power is positive and the mechanical power is zero, then it may be determined that the system is stopped. In this scenario, the system may be stalled, pressing a constraint, or holding a position against a disturbance. In another scenario, based on both the electrical power and the mechanical power being zero, it may be determined that a possible state of operation of the robotic device includes the robotic device being in an idle state.

Based on the electrical power being zero and the mechanical power being positive or negative, then it may be determined that the system associated with the robotic link is being back-driven, as shown in Table 1. If the system is being back-driven, it may be determined that an external torque is being applied to the transmission. In one example, when the electrical power is zero and the mechanical power is positive, it may be determined that the external torque is being applied at the input of the transmission while the motor is open-circuit. In another example, when the electrical power is zero and the mechanical power is negative, it may be determined that the external torque is being applied at the output of the transmission. In either of these examples, when the electrical power is about zero, it may also be determined that a circuit such as the motor drive circuit 302 of FIG. 3 is an open-circuit based on the position of switch 312.

The sign associated with the electrical power and the mechanical power may be updated according to a given computation cycle associated with one or more processors 170 of the robotic device 100 of FIG. 1. The results of Table 1 may be compared with expected behavior from a controller or model-based state estimates in order to determine if there is a discrepancy between the current state of operation and an expected state of operation. In one example, if a discrepancy is detected, then a fault or event detector may be used to handle the discrepancy. For example, when the electrical power is negative and the mechanical power is zero, the system may be in an indefinite state and may require notification of an individual responsible for the robotic device 100. By way of example, the indefinite state may be a result of an unexpected electromagnetic field disturbance.

In some examples, based on the electrical power being negative and the mechanical power being positive or negative as illustrated in Table 1, it may be determined that the system associated with the robotic link is being back-driven. Based on the system being back-driven, it may be determined than an external torque is being applied to the transmission. In one example, when the electrical power is zero and the mechanical power is positive, it may be determined that the external torque is being applied at the input of the transmission. Further, when the electrical power is zero and the mechanical power is negative, it may be determined that the external torque is being applied at the output of the transmission. In either of these examples, it may also be determined that a circuit such as the motor drive circuit 302 of FIG. 3 is a closed-circuit according to the position of switch 312. When mechanical power is supplied to the motor 304 and results in rotation of the motor 304, the motor 304 may produce electric power when the motor drive circuit 302 in a closed-circuit. In this scenario, the motor 304 is effectively converted into a generator.

Table 1 may be extended by providing additional measurements associated with a robotic device. For example, by including the mechanical power of the motor as an additional column to Table 1, the sign associated with the mechanical power of the motor may allow for greater granularity in isolating specific faults. In this example, the mechanical power of the motor may be determined by measurement of the motor velocity, using the electrical current to measure motor torque. Other examples of various power measurements are possible as well.

Figure 4:
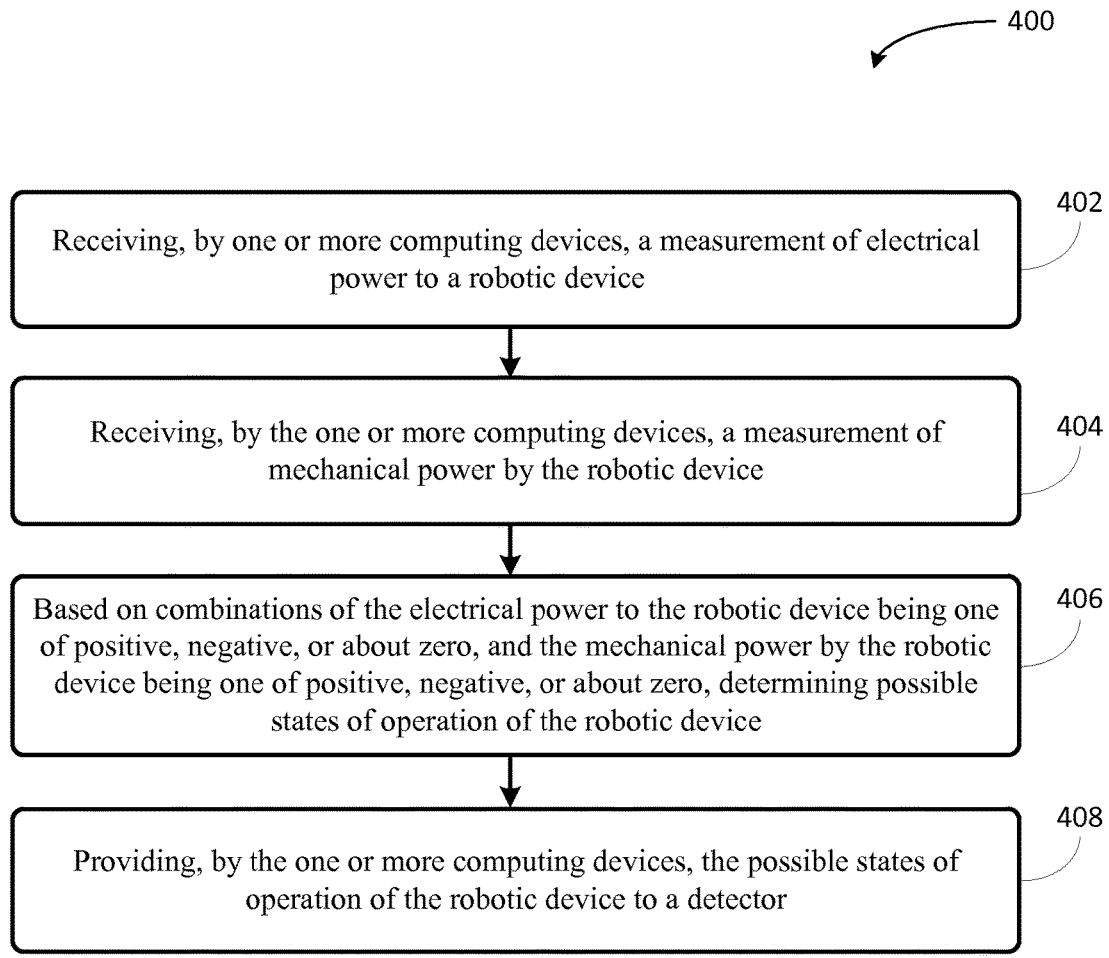
FIG. 4 is a block diagram of an example method for providing a possible state of operation of another example robotic device.

FIG. 4 is a block diagram of an example method for providing a possible state of operation of a robotic device, in accordance with at least some embodiments described herein. Method 400 may include one more operations, functions, or actions as illustrated by one or more of blocks 402-408. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process. Illustrative methods, such as method 400, may be carried out in whole or in part by a component or components in the cloud and/or a robotic system, such as by the one or more of the components of the robotic device 100 shown in FIG. 1. However, it should be understood that example methods, such as method 400, may be carried out by other entities or combinations of entities (i.e., by other computing devices and/or combinations of computing devices), without departing from the scope of the invention.

For example, functions of the method 400 may be fully performed by a computing device (or components of a computing device such as one or more processors), or may be distributed across multiple components of the computing device, across multiple computing devices, and/or across a server. In some examples, the computing device may receive information from sensors of the robotic device, or where the computing device is a server the information can be received from another device that collects the information. As other examples, the method 400 may be performed by a computing device, by a server, or by a robotic device.

As shown by block 402, method 400 includes receiving, by one or more computing devices, a measurement of electrical power to a robotic device. In one embodiment, the electrical power to the robotic device may be calculated according to equation 1 from above. In one instance, based on the calculation from equation 1, one or more processors may be configured to convert the measurement of electrical power to a positive, negative, or about zero based on a plurality of thresholds. In another instance, the one more processors may be configured to run an algorithm for determining a positive, negative, or about zero based on the measurement of electrical power.

As shown by block 404, method 400 includes receiving, by the one or more computing devices, a measurement of mechanical power by the robotic device. In one embodiment, the mechanical power by the robotic device may be calculated according to equation 2 from above. In one instance, based on the calculation from equation 2, one or more processors may be configured to convert the measurement of mechanical power to a positive, negative, or about zero based on a plurality of thresholds. In another instance, the one more processors may be configured to run an algorithm for determining a positive, negative, or about zero based on the measurement of mechanical power.

As shown by block 406, based on combinations of the electrical power to the robotic device being one of positive, negative, or about zero, and the mechanical power by the robotic device being one of positive, negative, or about zero, method 400 includes determining possible states of operation of the robotic device. For example, based on the electrical power being negative and the mechanical power being zero, it may be determined that a possible state of operation of the robotic device includes an unexpected operation of the robotic device. Determining the unexpected operation of the robotic device may require that the robotic device is powered off until it is determined what is causing the unexpected operation.

In another example, the measurement of mechanical power by the robotic device may include a measurement of mechanical power by a motor of the robotic device, and a measurement of mechanical power associated with a component of the robotic device driven by the motor. The measurement of mechanical power by the motor may provide additional information for determining possible states of operation of the robotic device. In this example, based on combinations of the electrical power to the robotic device being one of positive, negative, or about zero, the mechanical power associated with the component of the robotic device being one of positive, negative, or about zero, and the mechanical power by the motor being one of positive, negative, or about zero, one or more processors may be configured for determining possible states of operation of the robotic device.

As shown by block 408, method 400 includes providing, by the one or more computing devices, the possible states of operation of the robotic device to a detector. In one scenario, based on both the electrical power and the mechanical power being positive, determining that a possible state of operation of the robotic device includes a motor driving the robotic device. In another scenario, based on the electrical power being negative and the mechanical power being positive, determining that a possible state of operation of the robotic device includes a motor of the robotic device being externally back-driven.

Figure 5:
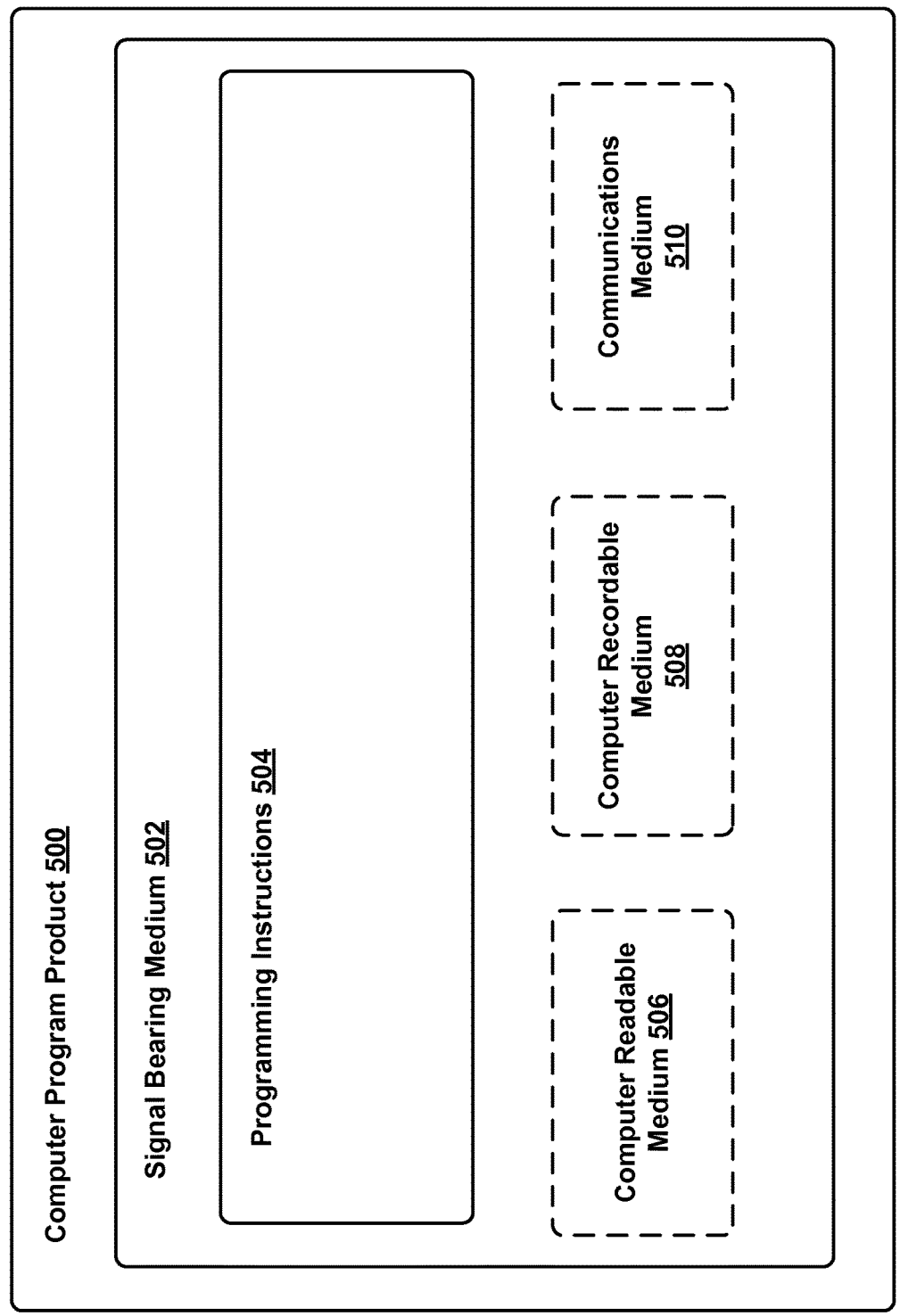
FIG. 5 depicts an example computer readable medium configured according to an example embodiment.

FIG. 5 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., functions of the robotic device 100, robotic device 200, method 400, etc.) may be implemented by computer program instructions encoded on a computer readable storage media in a machine-readable format, or on other media or articles of manufacture. FIG. 5 is a schematic illustrating a conceptual partial view of an example computer program product that includes a computer program for executing a computer process on a computing device, arranged according to at least some embodiments disclosed herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may be a computer-readable medium 506, such as, but not limited to, a hard disk drive, a Compact Disc (CD), a Digital Video Disk (DVD), a digital tape, memory, etc. In some implementations, the signal bearing medium 502 may be a computer recordable medium 508, such as, but not limited to, memory, read/write (R/W) CDs, R/W DVDs, etc. In some implementations, the signal bearing medium 502 may be a communication medium 510 (e.g., a fiber optic cable, a waveguide, a wired communications link, etc.). Thus, for example, the signal bearing medium 502 may be conveyed by a wireless form of the communications medium 510.

The one or more programming instructions 504 may be, for example, computer executable and/or logic implemented instructions. In some examples, a computing device may be configured to provide various operations, functions, or actions in response to the programming instructions 504 conveyed to the computing device by one or more of the computer readable medium 506, the computer recordable medium 508, and/or the communications medium 510.

In one example, data storage may comprise instructions executable by the one or more processors to cause the system to perform operations that enable the one or more processors to receive measurements of a voltage and a current detected at the motor by one or more sensors. The one or more processors may also be configured to receive a measurement of a torque detected at one or more positions along a transmission of the robotic device by the one or more sensors and receive a measurement of a velocity detected at the component of the robotic device by the one or more sensors.

After receiving the measurements of the voltage and the current associated with the robotic device, the one or more processors may be configured to determine an electrical power indicator based on the measurements of the voltage and the current. The electrical power indicator may be a positive value, a negative value, and about zero. By way of example, the electrical power indicator may be updated based on expected transition of the state of operation.

In a similar manner, the mechanical power indicator may be determined based on the measurements of the torque and the velocity. The mechanical power indicator may also be a positive value, a negative value, and about zero. In one scenario, an encoder may be coupled to the robotic device and configured to measure the velocity associated with the component. In this scenario, a force sensor may also be coupled to the robotic device and configured to measure the torque associated with the transmission. The mechanical power indicator may then be determined according to a direction of the velocity associated with the component and a direction of the torque associated with the transmission.

Further, the one or more processors may be configured to determine a state of operation of the robotic device based on the electrical power indicator and the mechanical power indicator. In one example, the one or more processors may provide information indicative of the state of operation of the robotic device to a detector. The detector may be configured to assist with handling of a fault based on the information indicative of the state of operation.

In another scenario, the one or more processors may be configured to receive information indicative of an expected state of operation of the robotic device. In this scenario, a comparison between at least one of the electrical power indicator and the mechanical power indicator to the information indicative of the expected state of operation may be performed. Based on the comparison, the one or more processors, may determine whether the robotic device is transitioning to the expected state of operation and provide information indicative of the comparison to an event handler.

The computer readable medium 506 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
controlling, by one or more computing devices, a robotic device to perform a predetermined motion to accomplish a task within an environment of the robotic device, wherein the robotic device includes (i) a motor configured to receive electrical power for causing movement of the motor, (ii) a transmission coupled to the motor, (iii) a torque sensor coupled to the transmission and configured to determine a torque of the transmission and a direction of rotation of the transmission, (iv) a link coupled to the transmission, and (v) an encoder configured to measure a velocity of the link, and wherein the predetermined motion involves the motor moving the link;
determining, by the one or more computing devices, an expected state of operation of the link of the robotic device, the expected state of operation being associated with performance of the predetermined motion;
while the robotic device is performing the predetermined motion:
determining, by the one or more computing devices, a first measurement of the electrical power received by the motor, wherein the firt measurement has a respective sign;
based on the velocity of the link measured by the encoder, the torque of the transmission determined by the torque sensor, and the direction of rotation of the transmission determined by the torque sensor, determining, by the one or more computing devices, a second measurement of mechanical power associated with the link, wherein the second measurement has a respective sign;
determining, by the one or more computing devices, a current state of operation of the link of the robotic device based on a comparison of the signs of the first and second measurements to predetermined reference data, wherein the predetermined reference data includes multiple distinct pairs of an electrical power measurement sign and a mechanical power measurement sign and correlates each pair with a state of operation of the link of the robotic device; and
making, by the one or more computing devices, a determination that the current state of operation differs from the expected state of operation; and
based on the determination that the current state of operation differs from the expected state of operation, controlling, by the one or more computing devices, the link of the robotic device to perform a physical action different from the predetermined motion.

2. The method of claim 1,
wherein the predetermined reference data includes a pair of a positive electrical power measurement sign and a positive mechanical power measurement sign and correlates the pair with a state of operation in which the motor is driving the robotic device, and
wherein determining the current state of operation of the link of the robotic device based on the comparison of the signs of the first and second measurements to the predetermined reference data comprises:
based on the predetermined reference data correlating the pair with the state of operation in which the motor is driving the robotic device, and based on the signs of the first and second measurements both being positive, determining the current state of operation of the link of the robotic device to be the state of operation in which the motor is driving the robotic device.

3. The method of claim 1,
wherein the predetermined reference data includes a pair of a negative electrical power measurement sign and a positive mechanical power measurement sign and correlates the pair with a state of operation in which the motor is externally back-driven, and
wherein determining the current state of operation of the link of the robotic device based on the comparison of the signs of the first and second measurements to the predetermined reference data comprises:
based on the predetermined reference data correlating the pair with the state of operation in which the motor is externally back-driven, based on the sign of the first measurement being negative, and based on the sign of the second measurement being positive, determining the current state of operation of the link of the robotic device to be the state of operation in which the motor is externally back-driven.

4. The method of claim 1, further comprising determining the first measurement of the electrical power received by the motor according to a measured voltage and a measured current provided to the motor of the robotic device.

5. A system comprising:
a robotic device including (i) a motor configured to receive electrical power for causing movement of the motor, (ii) a transmission coupled to the motor, (iii) a torque sensor coupled to the transmission and configured to determine a torque of the transmission and a direction of rotation of the transmission, (iv) a link coupled to the transmission, and (v) an encoder configured to measure a velocity of the link;
one or more processors; and
data storage comprising instructions executable by the one or more processors to cause the system to perform operations comprising:
controlling the robotic device to perform a predetermined motion to accomplish a task within an environment of the robotic device, wherein the predetermined motion involves the motor moving the link;
determining an expected state of operation of the link of the robotic device, the expected state of operation being associated with performance of the predetermined motion;
while the robotic device is performing the predetermined motion:
based on measurements of a voltage and a current associated with the motor, determining a first measurement of the electrical power received by the motor, wherein the first measurement has a respective sign;
based on the velocity of the link measured by the encoder, the torque of the transmission determined by the torque sensor, and the direction of rotation of the transmission determined by the torque sensor, determining a second measurement of mechanical power associated with the link, wherein the second measurement has a respective sign;
determining a current state of operation of the link of the robotic device based on a comparison of the signs of the first and second measurements to predetermined reference data, wherein the predetermined reference data includes multiple distinct pairs of an electrical power measurement sign and a mechanical power measurement sign and correlates each pair with a state of operation of the link of the robotic device; and
making a determination that the current state of operation differs from the expected state of operation; and
based on the determination that the current state of operation differs from the expected state of operation, controlling the link of the robotic device to perform a physical action different from the predetermined motion.

6. The system of claim 5, wherein the first measurement of the electrical power is determined further based on a first threshold,
wherein the second measurement of the mechanical power is determined further based on a second threshold, and
wherein the first threshold and the second threshold are updated according to the expected state of operation of the link of the robotic device.

7. The system of claim 6, further comprising:
updating the first threshold based on the second measurement of the mechanical power satisfying the second threshold and information representing the expected state of operation.

8. The system of claim 6, further comprising:
updating the second threshold based on the first measurement of the electrical power satisfying the first threshold and information representing the expected state of operation.

9. A non-transitory computer-readable medium having stored thereon program instructions that when executed by a computing system that includes at least one processor cause the computing system to perform operations comprising:
controlling a robotic device to perform a predetermined motion to accomplish a task within an environment of the robotic device, wherein the robotic device includes (i) a motor configured to receive electrical power for causing movement of the motor, (ii) a transmission coupled to the motor, (iii) a torque sensor coupled to the transmission and configured to determine a torque of the transmission and a direction of rotation of the transmission, (iv) a link coupled to the transmission, and (v) an encoder configured to measure a velocity of the link, and wherein the predetermined motion involves the motor moving the link;
determining an expected state of operation of the link of the robotic device, the expected state of operation being associated with performance of the predetermined motion;
while the robotic device is performing the predetermined motion:

receiving measurements of a voltage and a current detected by one or more sensors at the motor of a robotic device;

determining, by the torque sensor, a torque of the transmission and a direction of rotation of the transmission;

measuring, by the encoder, the velocity of the link;

based on the measurements of the voltage and the current, determining a first measurement of the electrical power received by the motor, wherein the first measurement has a respective sign;

based on the velocity of the link measured by the encoder, the torque of the transmission determined by the torque sensor, and the direction of rotation of the transmission determined by the torque sensor, determining a second measurement of mechanical power associated with the link, wherein the second measurement has a respective sign;

determining a current state of operation of the link of the robotic device based on a comparison of the signs of the first and second measurements to predetermined reference data, wherein the predetermined reference data includes multiple distinct pairs of an electrical power measurement sign and a mechanical power measurement sign and correlates each pair with a state of operation of the link of the robotic device; and making a determination that the current state of operation differs from the expected state of operation; and based on the determination that the current state of operation differs from the expected state of operation, controlling the link of the robotic device to perform a physical action different from the predetermined motion.

10. The non-transitory computer-readable medium of claim 9, wherein determining the second measurement of the mechanical power is further based on direction of the velocity of the link.

11. The method of claim 1, wherein the predetermined reference data includes a pair of a positive electrical power measurement sign and a negative mechanical power measurement sign and correlates the pair with a state of operation in which the motor is driving the robotic device, and wherein determining the current state of operation of the link of the robotic device based on the comparison of the signs of the first and second measurements to the predetermined reference data comprises:

based on the predetermined reference data correlating the pair with the state of operation in which the motor is driving the robotic device, based on the sign of the first measurement being positive, and based on the sign of the second measurement being negative, determining the current state of operation of the link of the robotic device to be the state of operation in which the motor is driving the robotic device.

12. The method of claim 1, wherein the predetermined reference data includes a pair of a negative electrical power measurement sign and a negative mechanical power measurement sign and correlates the pair with a state of operation in which the motor is externally back-driven, and wherein determining the current state of operation of the link of the robotic device based on the comparison of the signs of the first and second measurements to the predetermined reference data comprises:

based on the predetermined reference data correlating the pair with the state of operation in which the motor is externally back-driven, and based on the signs of the first and second measurements both being negative, determining the current state of operation of the link of the robotic device to be the state of operation in which the motor is externally back-driven.

* * * * *